Patented Apr. 17, 1923.

1,452,185

UNITED STATES PATENT OFFICE.

HARRY W. CHARLTON AND RANDOLPH NORRIS SHREVE, OF NEW YORK, N. Y., ASSIGNORS TO AMERICAN POTASH CORPORATION, OF NEW YORK, N. Y., A CORPORATION OF VIRGINIA.

ALKALI-METAL PRODUCT AND PROCESS OF PRODUCING THE SAME.

No Drawing.    Application filed March 5, 1921. Serial No. 449,912.

*To all whom it may concern:*

Be it known that we, HARRY W. CHARLTON and RANDOLPH NORRIS SHREVE, respectively, a citizen of Canada and a citizen of the United States, each residing at New York, in the county of New York and State of New York, have invented certain new and useful Improvements in Alkali-Metal Products and Processes of Producing the Same; and we do hereby declare the following to be a full, clear, and exact description of the invention, such as will enable others skilled in the art to which it appertains to make and use the same.

This invention relates to potassium compounds and has for its object the production of such compounds from greensand in a manner more expeditious and less costly than has heretofore been proposed, together with sodium hydroxide as a by product.

With these and other objects in view the invention consists in the novel steps and combination of steps constituting the process and in the novel composition of matter constituting the product, all as will be more fully hereinafter disclosed and particularly pointed out in the claims.

In order that the precise invention may be the more clearly understood, it is said:

In the prior U. S. patents issued to H. W. Charlton, #1,329,369, dated February 3, 1920, process of producing combined potassium from greensand; and #1,334,989, dated March 30, 1920, a new process and product are disclosed through which it is possible to economically produce solutions of potassium hydrate associated with a very small percentage of certain impurities such as potassium chloride, sulphate, silicate and organic matter.

Stated in general this prior process involves the admixture and digestion under superatmospheric pressure and at elevated temperatures of substantially equal parts of finely ground greensand and lime in presence of sufficient water to give the mass a thick creamy consistency.

According to this invention, on the other hand, one may take for example, by weight, say 85 parts of finely divided greensand, add thereto 85 parts of quicklime, or CaO, and 10 parts of sodium nitrate. NaNO$_3$, mixed with 425 parts of water, and digest the mixture at, say, about 500 pounds pressure corresponding to 470° F., for about 40 minutes, when it will be found that about 80% of the total potassium present will appear in the resulting solution after filtering in the form of potassium nitrate in solution with sodium hydroxide.

In a specific instance, it was found that only 61% of potassium present in the greensand appeared in the soluble form when no sodium nitrate was used, while more than 79% of said potassium was dissolved, under precisely the same conditions when sodium nitrate was employed.

From the above it is quite evident that there is a most decided increase in proportion of potassium liberated due to the addition to the digestion mixture of sodium nitrate. It is true that the potassium in the latter case is present in the form of a nitrate, while in the prior instance it apears as potassium hydroxide. But, as is more fully disclosed in a copending application of even date, the presence of potassium nitrate or other potassium salt, which has been added before the digestion began, will increase the yield irrespective of the fact that the liberated potassium is found to be in the form of a hydrate.

From the above illustration it is not to be inferred that the invention is limited to the changed process resulting from the addition of sodium nitrate to the digestion mixtures disclosed in the prior Charlton patents referred to above. On the contrary, the addition of most sodium salts shows a decided increase in the yield.

The following results of digestion operations illustrate this:

| | Percentage recovery of potassium. |
|---|---|
| Greensand—lime—water | 61.1 |
| Greensand—lime—sodium nitrate—water | 81.0 |
| Greensand—lime—sodium nitrite—water | 79.1 |
| Greensand—lime—sodium acetate—water | 74.6 |
| Greensand—lime—sodium sulphide—water | 66.9 |
| Greensand—lime—sodium cyanide—water | 66.8 |
| Greensand—lime—sodium phosphate—water | 65.2 |
| Greensand—lime—sodium chlorate—water | 80.5 |
| Greensand—lime—sodium bromide—water | 72.9 |
| Greensand—lime—sodium aluminate—water | 79.8 |
| Greensand—lime—sodium citrate—water | 68.0 |
| Greensand—lime—sodium hypochlorite—water | 92.9 |
| Greensand—lime—sodium fluoride—water | 77.9 |
| Greensand—lime—sodium sulphate—water | 70.8 |

In the above digestions the weights used are essentially 1 part of greensand, 1 part of lime, 5 parts of water, and a weight of sodium salt capable of combining with 90% of the potassium present in the particular sample of greensand under treatment; the digestion was carried out under superatmospheric pressure corresponding to temperature of about 470° Fahrenheit for 40 minutes.

Sodium chloride also shows an increased yield, for example, there was recovered 56.7% of the potassium in the greensand in 20 minutes digestion, while under the same conditions without the sodium chloride, there was yielded only 47% of the potassium.

It is a well known and established fact that various even closely related salts taking part in chemical reactions often exhibit peculiar idiosyncrasies and give the best results when working under physical conditions peculiar to each individual salt. For this reason the results above recorded are to be considered solely as illustrative of the broad patentable feature underlying the invention. To obtain the best results each case must be considered separately and treated under conditions best suited to itself.

It is also clear that the amount of sodium nitrate or other compounds supplying the desired acid radical to the potassium will depend upon the amount of potassium in the greensand. To avoid contaminating the resulting solution of potassium salt after digestion, it is best to avoid an excess. In fact in practice it has been found most advisable to add about 90% of the amount theoretically required.

From a consideration of the case in which sodium nitrate is employed in the digestion, it is evident that the relative insolubility of potassium nitrate is a very beneficial feature. All that is necessary to obtain this salt in a state of remarkable purity is to evaporate the diluted solution of sodium hydroxide and potassium nitrate, when the latter will separate out by crystallization. It is found that potassium nitrate readily crystallizes from a solution of sodium hydroxide. Although slight impurities, such as potassium chloride, sulphate, etc., some times occur, they are present in such small amounts as to be inconsequential.

Further, the sodium hydrate after separation from the potassium nitrate or other potassium salt, is likewise found to be sufficiently pure for commercial purposes.

It will now also be clear that one is enabled to produce the above mentioned two products, viz., and alkali metal hydrate and an alkali metal nitrate in a single operation from greensand.

Although this process has been exemplified largely by its application to greensand, yet it is found that it will operate on the distantly related leucite, phonolite, etc., and other silicate potash bearing rocks, in a manner similar to that disclosed in connection with greensand.

In carrying out a digestion with greensand, it is preferred to grind it, preferably to pass a screen of 200 mesh, as the reaction is hastened and the yield accordingly increased.

It is obvious that those skilled in the art may vary the details of the procedure without departing from the spirit of the invention, and, therefore, it is not desired to be limited to the above disclosure, except as may be required by the claims.

We claim:

1. The process of dissolving potassium from greensand which consists in heating said material with lime, water and a sodium salt having an acid radical adapted to combine with an alkali metal, substantially as described.

2. The process of dissolving potassium from greensand which consists in heating said sand under a superatmospheric pressure with a mixture of lime and water and a sodium salt having an acid radical adapted to combine with potassium; substantially as described.

3. The process of dissolving potassium from greensand which consists in heating a mixture of said sand, lime, water, and an alkali metal nitrate, under a pressure exceeding 100 pounds to the square inch and at a corresponding temperature; substantially as described.

4. The process of producing potassium nitrate and sodium hydroxide which comprises digesting a mixture of greensand, lime, sodium nitrate and water; substantially as described.

5. The process of producing potassium nitrate and sodium hydroxide which comprises digesting a mixture of greensand, lime, sodium nitrate and water at elevated temperatures and under superatmospheric pressures; filtering the sludge; concentrating the resulting liquor to a point at which the major portion of the potassium nitrate crystallizes out, and removing the crystals from the solution of sodium hydroxide; substantially as described.

6. The process of producing potassium nitrate and sodium hydroxide which comprises digesting 500 parts of ground greensand, 500 parts of lime, 2500 parts of water and a weight of sodium nitrate containing a sufficient amount of the nitric acid radical to combine with 90 per cent of the potassium contained in the greensand; at a steam pressure of approximately 500 pounds for a period of approximately 40 minutes; substantially as described.

7. The herein described digestion product consisting of a filtrate resulting from the digestion of greensand with a mixture of lime, water, and an alkali metal salt and containing in solution a potassium salt and an alkali metal hydroxide; substantially as described.

8. The herein described digestion product consisting of a filtrate resulting from the digestion of greensand with a mixture of lime, water and sodium nitrate, and containing in solution sodium hydroxide and potassium nitrate admixed with impurities, substantially as described.

In testimony whereof we affix our signatures.

HARRY W. CHARLTON.
RANDOLPH NORRIS SHREVE.